United States Patent [19]
Duffy

[11] Patent Number: 5,531,892
[45] Date of Patent: Jul. 2, 1996

[54] ZIGZAG FILTER MEDIA AND FRAME HAVING TRIANGULAR PLEAT STABILIZING ELEMENTS

[75] Inventor: Dean R. Duffy, Woodbury, Minn.

[73] Assignee: Minnesota Mining and Manufacturing Company, St. Paul, Minn.

[21] Appl. No.: 529,144

[22] Filed: Sep. 15, 1995

[51] Int. Cl.$^6$ ........................................ B01D 27/08
[52] U.S. Cl. .................. 210/493.1; 210/497.01; 55/492; 55/493; 55/497; 55/499; 55/500; 55/501; 55/510; 55/511; 55/521; 55/DIG. 31
[58] Field of Search ..................... 210/232, 489, 210/490, 493.1, 493.5, 495, 497.01, 497.2; 156/60, 73.1, 379.6, 380.1; 55/492, 493, 494, 497, 499, 500, 501, 510, 511, 521, DIG. 31

[56] References Cited

U.S. PATENT DOCUMENTS

| | | | |
|---|---|---|---|
| 2,058,669 | 10/1936 | Dollinger | 183/71 |
| 3,397,518 | 8/1968 | Rogers | 55/497 |
| 3,692,184 | 9/1972 | Miller, Jr. et al. | 210/437 |
| 3,793,813 | 2/1974 | McAllister | 55/481 |
| 3,853,529 | 12/1974 | Boothe et al. | 55/499 |
| 3,873,288 | 3/1975 | Wachter et al. | 55/497 |
| 4,177,050 | 12/1979 | Culbert et al. | 55/499 |
| 4,547,950 | 10/1985 | Thompson | 29/445 |
| 5,098,767 | 3/1992 | Linnersten | 428/182 |
| 5,167,740 | 12/1992 | Michaelis et al. | 156/73.1 |
| 5,240,479 | 8/1993 | Bachinski | 55/103 |
| 5,273,563 | 12/1993 | Pasch et al. | 55/497 |
| 5,306,321 | 4/1994 | Osendorf | 55/487 |
| 5,376,218 | 12/1994 | Mito et al. | 156/474 |
| 5,397,632 | 3/1995 | Murphy, Jr. et al. | 428/284 |

FOREIGN PATENT DOCUMENTS

| | | | |
|---|---|---|---|
| 124754 | 6/1947 | Australia | 55/497 |
| 495320 | 11/1938 | United Kingdom | 55/497 |
| WO93/11849 | 6/1993 | WIPO . | |
| WO94/01200 | 1/1994 | WIPO | 55/497 |

Primary Examiner—W. L. Walker
Attorney, Agent, or Firm—Gary L. Griswold; Walter N. Kim; William J. Bond

[57] ABSTRACT

There is provided a pleated zig-zag filter in a filter frame assembly. The filter frame has triangular shaped pleats stabilizing elements on two sidewalls with the pleat stabilizing elements forming a pleat retaining gap that frictionally engage with the filter pleat tips on one face of the filter holding the filter in the frame assembly. The pleat stabilizing elements engage the filter pleat tips on the second face.

24 Claims, 5 Drawing Sheets

ZIGZAG FILTER MEDIA AND FRAME HAVING TRIANGULAR PLEAT STABILIZING ELEMENTS

BACKGROUND AND FIELD OF THE INVENTION

This invention relates to a filter housing and pleated filter for the filtration of particulate matter from fluids, particularly air.

There are many known filters that use a fibrous nonwoven filter media that is pleated into a zigzag shape. This shape of filter media is desirable in terms of providing good filter efficiency and loading capacity in a relatively small cross-sectional area.

The structural integrity of the pleated filter's zigzag shape is typically provided by a rigidifying member other than the filter material. For example, U.S. Pat. No. 3,793,813 discusses the use of a cardboard frame in which is included the fibrous filter material. Also employed in the art are wire supports, such as discussed in U.S. Pat. No. 3,853,529 and polymeric rigidifying materials which are disclosed, for example, in U.S. Pat. Nos. 5,376,218, 5,240,479 and 5,306,321 and PCT Application No. 93/11849. With the possible exception of thicker wire mesh support, generally these rigidifying elements are not sufficiently rigid at the bending lines to maintain the pleat spacing of the filter material and additional external supports are required. A common approach is to adhesively secure the side edges of the pleated filter to the sidewalls of a rigid filter frame, such as disclosed in U.S. Pat. Nos. 5,397,632 and 5,098,767. However, there have been proposals to maintain pleat spacing by other methods including adhesive beads placed on the strip along the tops of the pleat structures as disclosed in U.S. Pat. No. 3,692,184 and a bead of adhesive, such as disclosed in U.S. Pat. No. 3,397,518.

In U.S. Pat. No. 5,306,321 pleat spacing is maintained by forming indents at the tops of the pleated filter which indents form "Pleatloc" dimples. These dimples contact each other and thereby prevent the pleated filter faces from coming into full contact and also maintain pleat spacing.

In U.S. Pat. No. 5,167,740 the pleat spacing of a zigzag filter is maintained by placing the filter material, along with any polymeric rigidifying netting, into a jig with a portion of thermoplastic filter material and netting extending beyond the jig. This extended filter and netting material is then swiped with a heated platen while in the jig. This fuses the thermoplastic filter material and netting forming a rigid continuous side panel of the fused thermoplastic material. As the fused side panel is still continuously connected to the pleated filter material the pleat spacing of the filter material is locked in place.

Mechanical means for maintaining pleat spacing include zigzag teeth-type elements. In U.S. Pat. No. 3,793,813, two zigzag shaped ribs are placed along two opposing sidewalls of a filter housing. The rigid pleated filter, in a cardboard frame, sits on these ribs so that the ribs maintain the pleat spacing of the filter. In U.S. Pat. No. 4,547,950, two tapered combs are placed on the downstream face of a pleated filter where the teeth of the combs extend partially into the upstream pleat structures. The teeth of the combs space the pleats on one face of the zigzag filter. The airflow presses the filter media against the teeth on the opposite face thereby maintaining the pleat spacing on that face. In both of the above patents the filter media would be pressed into the teeth valleys by the oncoming air stream. A problem with this approach is that the filter media can easily fall out if not restrained on the opposite face when not in use (i.e., during production, installation, shipping, etc.).

In other U.S. patents, instead of teeth-type support structures on only one face of the pleated filter, two interengaging teeth structures are used. These interengaging teeth are on opposite faces of the pleated filter thereby clamping the zigzag shaped filter media between the opposing teeth elements, such as disclosed in U.S. Pat. Nos. 2,058,669, 4,177,050 and 3,873,288. This avoids problems with the filter media falling out, however, filter media performance is lost where the opposing teeth elements engage. In the first two patents, multiple interengaging teeth elements are placed along the central body portion of the filter housing, although in the '050 patent the opposing teeth do not fully engage. This is to avoid overly compressing the filter medium to minimize loss of filter performance. In U.S. Pat. No. 3,873,288 the opposing interengaging teeth fully compress the filter medium between the engaging teeth elements, however, the teeth elements also form the housing and as such, the teeth only peripherally engage and compress the filter medium.

BRIEF SUMMARY OF THE INVENTION

A zigzag filter comprising a zigzag shaped filter media and a filter frame. The filter frame has two continuous outer sidewalls and two inner sidewalls. Each of said inner and outer sidewalls are separated by a continuous fluid impermeable spacer element. The inner sidewalls have a plurality of upstanding triangular shaped pleat stabilizing elements with first pleat stabilizing element sidewalls tapering outward from a peak toward second pleat stabilizing element sidewall segments. Adjacent second sidewall segments form a pleat retaining gap. The pleat stabilizing elements have a shape such that the pleat stabilizing elements support and engage the zigzag filter first pleat tips on a first face of the filter. The second series of pleat tips are frictionally engaged by the pleat retaining gaps on the first filter face such that the filter second face pleat tips are partially compressed in said pleat retaining gaps.

DETAILED DESCRIPTION OF THE PREFERRED EMBODIMENTS

Figure 1:
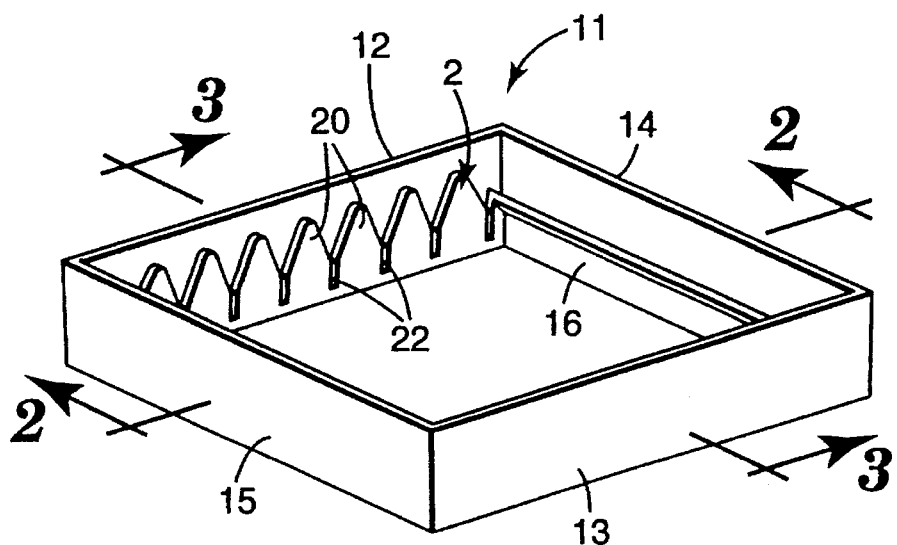
FIG. 1 is a perspective view of a first embodiment of a filter frame in accordance with the invention.
Figure 2:
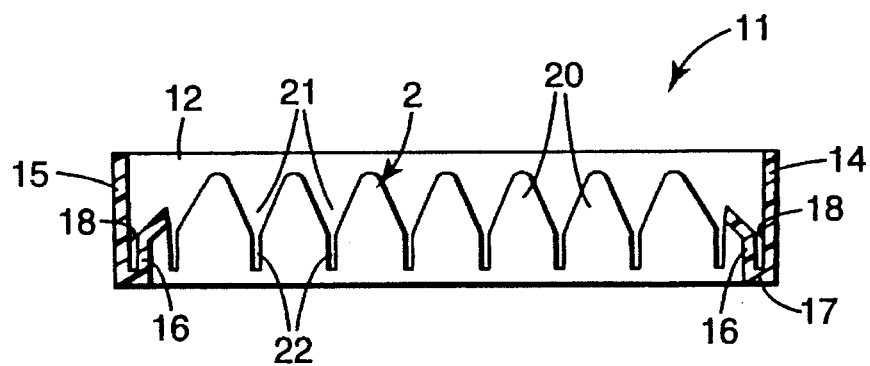
FIG. 2 is a cross-sectional view of the FIG. 1 filter frame taken along lines 2—2.
Figure 3:
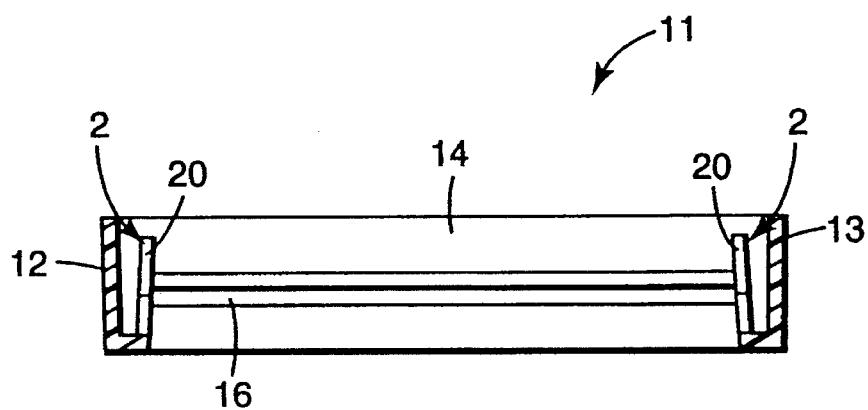
FIG. 3 is a cross-sectional view of the FIG. 1 filter frame taken along lines 3—3.

FIG. 1 is a perspective view of an invention filter frame 11 with outer endwalls 14 and 15 and outer sidewalls 12 and 13. Spaced from the two outer sidewalls 12 and 13 are side pleat stabilizing inner sidewalls 2 with pleat stabilizing elements 20, which are generally triangular structures in the shape of an individual filter pleat. Spaced from the two outer endwalls 14 and 15 are terminal pleat retaining inner endwalls 16. The inner endwalls 16 are spaced from the outer endwalls 14 and 15 to form a terminal pleat retaining gap 18, as shown in FIG. 2. Preferably, the inner endwall 16 is tapered to facilitate insertion of the terminal filter pleat into the terminal pleat retaining gap 18.

The two outer sidewalls 12 and 13 and the inner sidewalls 2 can be straight as shown in FIG. 1 or they can form an arched or curved shape. The endwalls (14, 15, 16) are preferably straight and parallel. The inner sidewalls 2 are provided with the pleat stabilizing elements 20 which between adjacent pleat stabilizing elements 20 form a pleat receiving gaps 21, as shown in FIG. 2. The pleat receiving gaps 21 terminate in a pleat tip retaining gap 22.

Figure 4:
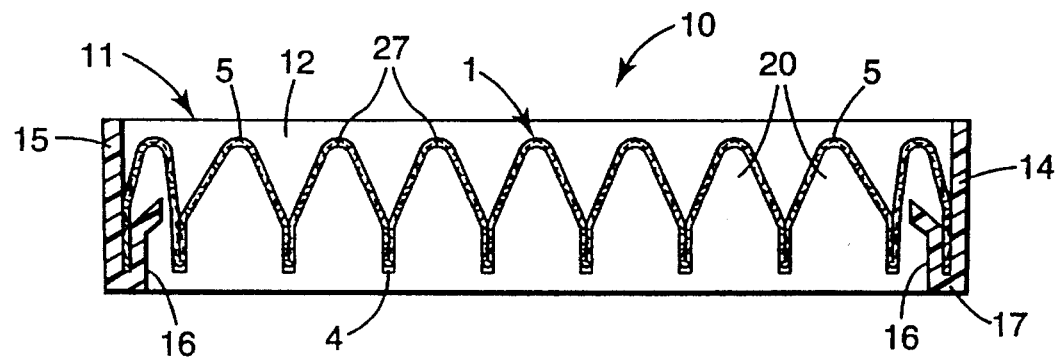
FIG. 4 is a cross-sectional view, as in FIG. 2, with a zigzag filter media inserted in the filter frame.

The pleat tip retaining gap 22 is of a size and shape such that it frictionally engages with the outer face of the filter media 1 pleat tips 4 as shown in FIG. 4 which shows the filter 10 with the filter frame 11 and media 1. The opposing filter media 1 pleat tip 5 inner face follows the contour of the pleat stabilizing element 20 tip 27.

Figure 5:
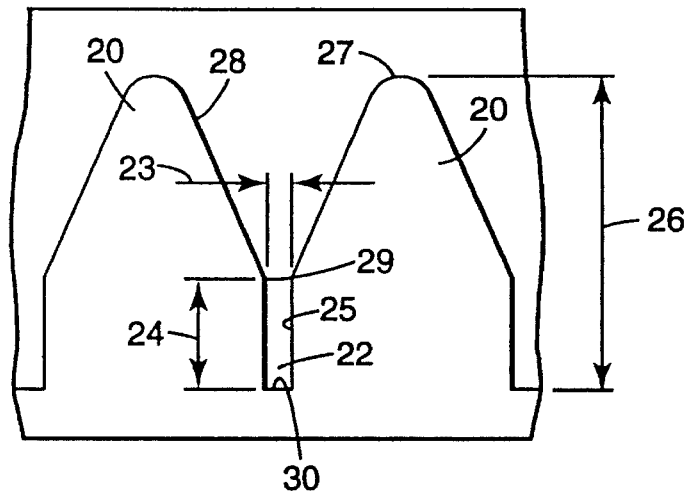
FIG. 5 is a cross-sectional cutaway view of an invention filter frame pleat stabilizing elements.

The pleat stabilizing element 20 tapers away from tip 27 with generally smooth sidewalls 28 until the pleat tip retaining gap 22 as shown in FIG. 5. The tip 27 generally has a radius of curvature such that the filter media can follow the tip without any gaps forming between the filter media and the pleat stabilizing element 20, although this depends on the conformability of the filter media, stiffer media will require a larger radius of curvature than a more conformable filter media. Similarly, tapering sidewalls 28 do not have any abrupt angles or structures and are preferably flat so that the filter media 1 follows the sidewalls without any gaps forming between the sidewalls 28 and the filter media 1. The pleat stabilizing element 20 sidewalls 28 generally taper at an angle of from 20 to 55 degrees, preferably 30 to 45 degrees. At the terminal portion of sidewalls 28 two adjacent pleat stabilizing elements 20 form a pleat tip retaining gap 22 by two adjacent sidewall segments 25. Sidewall segments 25 taper at an angle of from about 0 to 10 degrees, preferably, from 0 to 5 degrees. Although more difficult to manufacture, the sidewall segments 25 could also flare outwardly (i.e., get wider from top 29 to bottom 30) or taper at different angles at different segments along the sidewalls. The minimum width 23 of the pleat retaining gap is generally 90 to 10 percent of the uncompressed thickness of the filter media and any stiffening elements at the pleat tip of the zigzag pleated filter, preferably 80 to 20 percent. The minimum width 23 is preferably present over an extent 24 of at least three times the width of gap 23 and is preferably at least five times the width of gap 23. The extent and percent of the filter media pleat tip 4 in the pleat tip retaining gaps 22 determine the amount of force required to dislodge the filter media from the pleat tip retaining gaps 22. Other factors will include the relative coefficient of friction between the filter media pleat tips 4 and the pleat tip retaining gap sidewalls 25, the depth and thickness of the pleat tip retaining gaps 22 and the method by which the filter media is inserted into the pleat tip retaining gaps 22.

Figure 6:
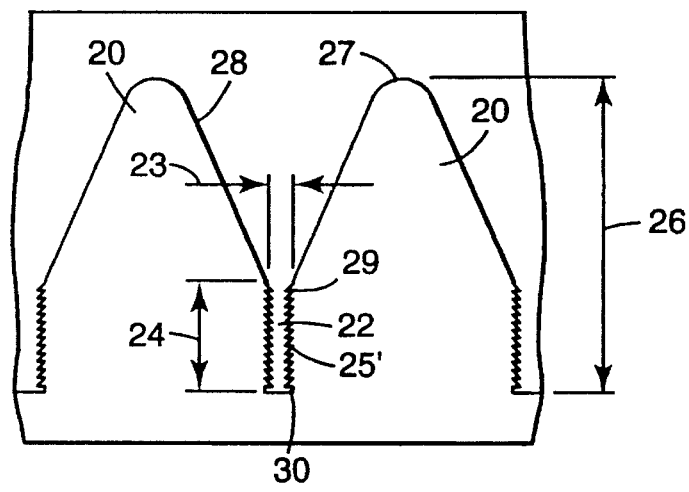
FIG. 6 is a cross-sectional cutaway view of a second embodiment of an invention filter frame pleat stabilizing elements.

The pleat tip retaining gap 22 sidewalls 25' can have a frictional engaging surface such as shown in FIG. 6 where the sidewall surface is textured or roughened to enhance the frictional engagement between the sidewalls 25' and the filter media 1. Also, suitable for a frictional engaging surface would be providing sidewalls 25 with a high coefficient of friction surface or adhesive coating, such as a natural or synthetic rubber based coating, to enhance the frictional engagement with the filter media 1.

The terminal pleat tip retaining gap 18, if provided, can also be designed to frictionally engage the terminal pleat(s) of the pleated filter media.

Downstream of the pleat tip retaining gap 22, the inner and outer sidewalls and endwalls are joined by spacer 17. The spacer 17 is preferably continuous so as to not permit passage of unfiltered fluid or air between the inner and outer sidewalls and endwalls, if provided. Otherwise, the space between the inner and outer sidewalls and endwalls is without any structure to allow for unobstructed insertion of the pleated filter media into the pleat tip retaining gap 22 and any terminal pleat retaining gap 18. Once inserted into the pleat tip retaining gap 22, the filter media 1 is relatively secure allowing for conventional handling without risk of the pleated filter media inadvertently falling out. However, the filter media 1 is not permanently held in so that it can be easily removed, if required and replaced.

Figure 7:
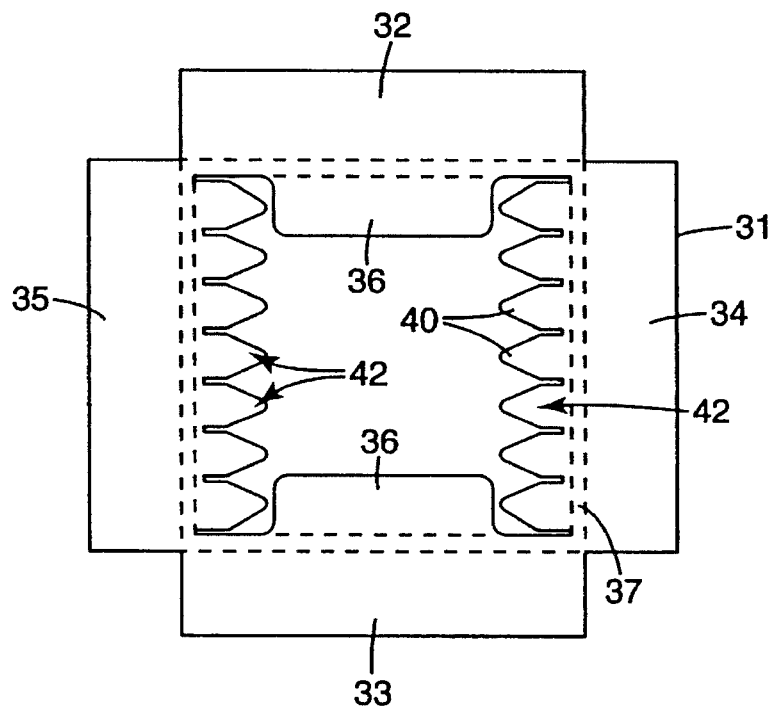
FIG. 7 is a top view of a blank used to form a second embodiment filter frame in accordance with the invention.

The embodiment of FIGS. 1 to 4 is preferably a molded structure formed from a moldable thermoplastic material, such as a polyolefin polymer like polypropylene. In a second embodiment, FIG. 7, a rigid or semirigid deformable material is formed into a flat preframe element 31 with outer sidewall flaps 34 and 35 and outer endwall flaps 32 and 33. The inner sidewall flaps 42 are provided with pleat stabilizing elements 40. Inner endwall flaps 36 are also provided. To form the filter frame, the inner and outer sidewall flaps (34, 35 and 42) and the endwall flaps (32, 33 and 36) are folded upward, preferably along pre-formed score lines. The outer sidewall flaps and endwall flaps (32, 33, 34 and 35) are joined at their corner portions by conventional means such as heat bonding, ultrasonic welding, adhesives, clips or the like. Alternatively, the corner portions could be provided with an engaging structure such as a tongue and groove joint, a snap structure or the like. Spacer element 37 provides a fluid tight spacing between the sidewalls and the endwalls. The FIG. 7 pre-frame element could be produced by molding as for the FIG. 1 embodiment or by nonmolding process (e.g., stamping or die-cutting) from non-moldable yet deformable materials such as fiberboard, cardboard, sheet metal, sheet plastics or the like.

Figure 8:
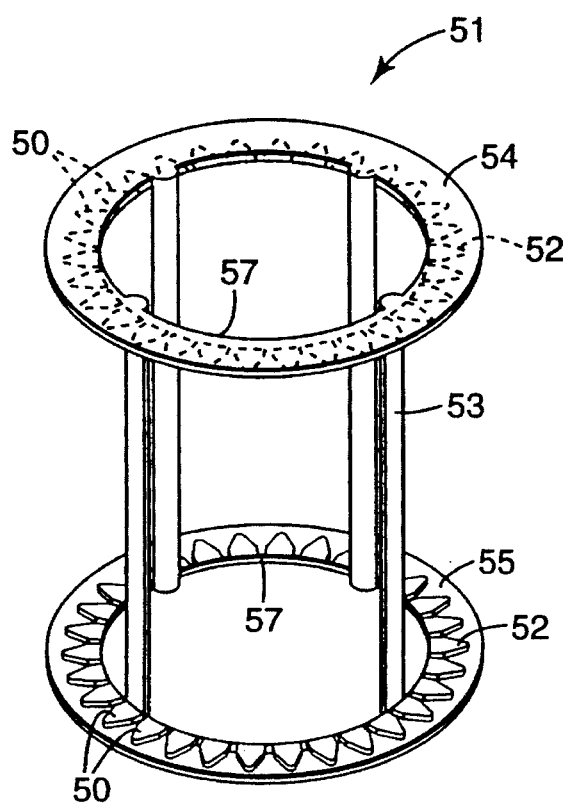
FIG. 8 is a perspective view of a third embodiment filter frame in accordance with the invention.

FIG. 8 shows a third embodiment filter frame 51. This circular filter frame 51 has outer sidewalls 54 and 55 and inner sidewalls 52 as in the FIGS. 1 to 4 embodiment, however, these sidewalls have no ends forming an annular body. The inner sidewalls 52 are also provided with pleat stabilizing elements 50 as per the FIGS. 1 to 4 embodiment. The need for endwalls is eliminated provided that the filter media terminal pleat ends are joined such as by gluing, heat bonding, ultrasonic welding, mechanical clips, sewing or the like. The two sidewall sections are separated by connecting elements 53 which are shown as rods, however, these connecting elements could be any suitable shape as long as they provide an open area for fluid passage through the pleated filter media. The sidewalls are shown forming a circular angular body but other shapes are possible.

Figure 10:
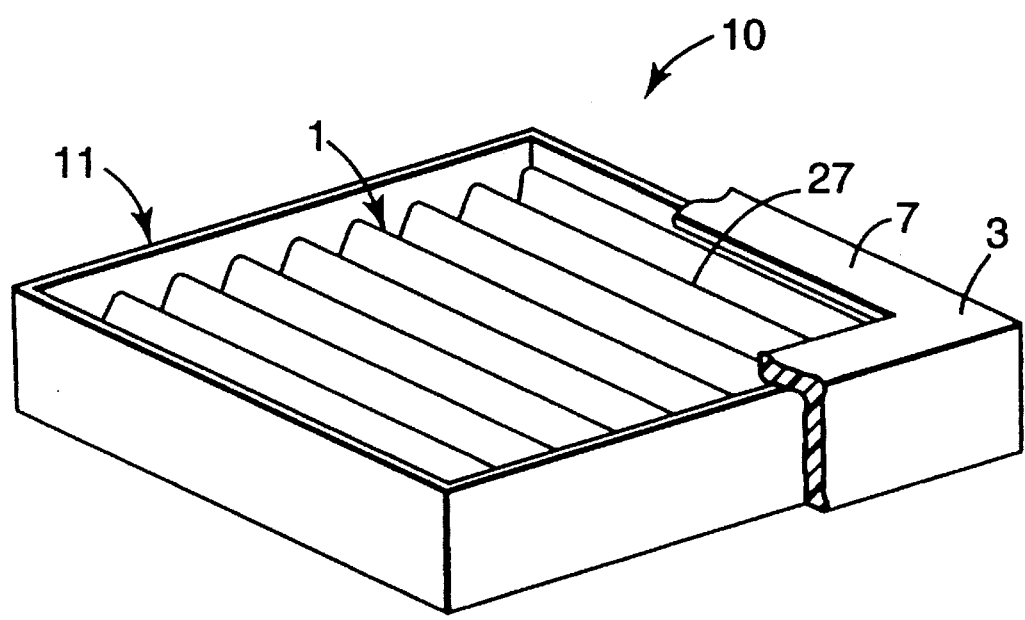
FIG. 10 is a cutaway perspective view of a filter housing used with an invention filter frame.

FIG. 10 shows an invention filter 10 filter frame 11, such as that of the first two embodiments, in a filter housing 3. The filter housing 3 preferably has a lip structure 7 that projects into the filter frame face such that it engages the filter media 1 at the periphery of peaks 27. This helps to secure the filter media 1 into the filter frame 11.

Figure 11:
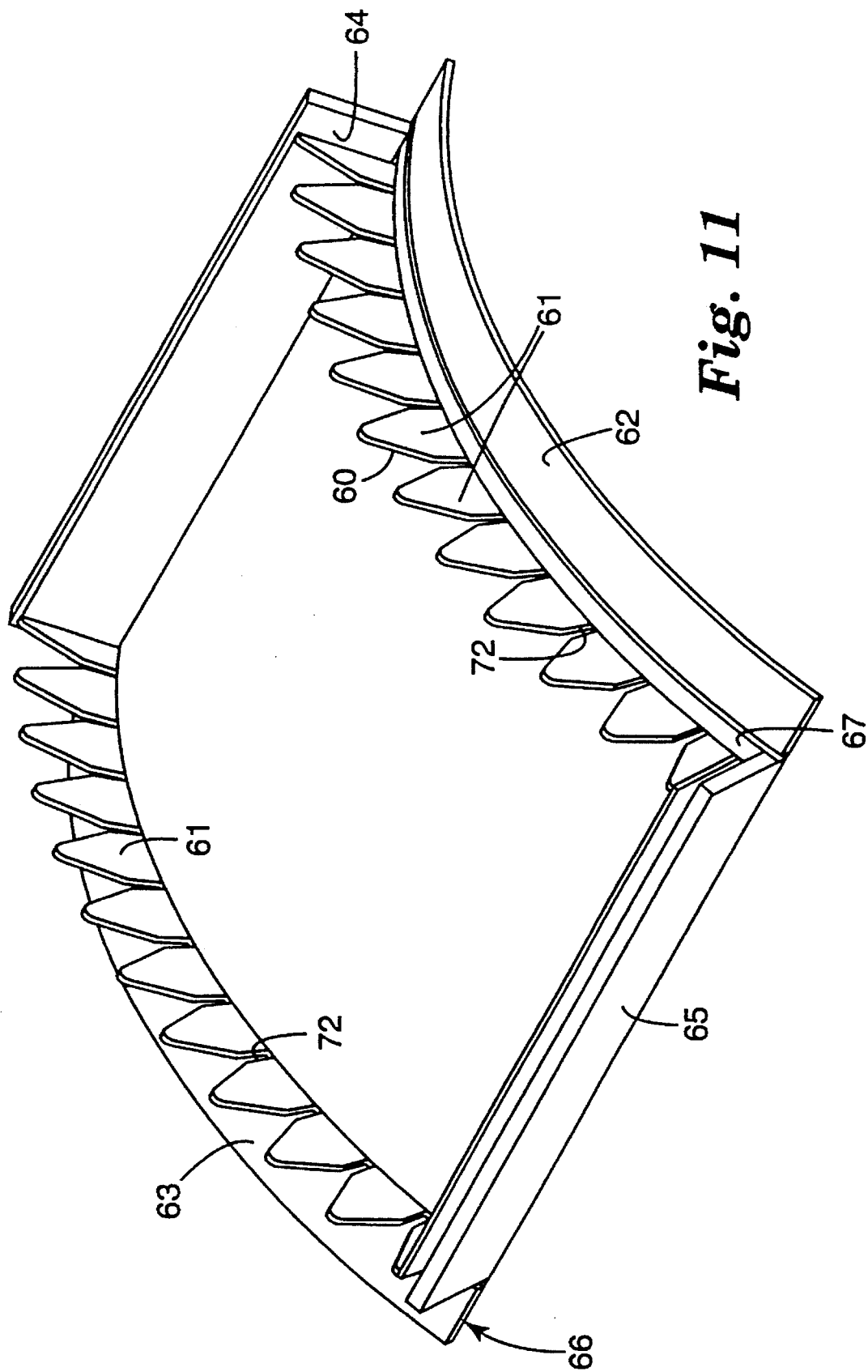
FIG. 11 is a perspective view of a fourth embodiment filter frame in accordance with the invention.

FIG. 11 is a third method of forming a filter frame 66 such as shown in FIG. 1. The filter frame 66 is formed of a flexible material, generally a thermoplastic polymer that has elastic recovery properties under deformation and is capable of forming a living hinge. Such a flexible thermoplastic material would be polypropylene. The outer sidewalls 62 and 63 fold out flat, preferably along a living hinge, allowing the frame 66 to be resiliently deformed into the arched shape shown in FIG. 11. The inner sidewalls 61 are upstanding with the pleat retaining gaps 72 extending down so as to be adjacent or closely adjacent to the spacer elements allowing the frame to arch with the pleat stabilizing elements 60 moving apart, also causing the pleat tip retaining gaps 72 to widen. This widening of the gaps 72 facilitates insertion of the pleated filter media 1 pleat tips 4 into the pleat tip retaining gaps 72. Once the filter media pleat tips 4 are inserted, the deformation force on the filter frame 66 is released allowing the frame to return to its original shape narrowing the pleat tip retaining gaps 72 to grip the pleated filter pleat tips. The outer sidewalls 62 and 63 can then be joined to outer endwalls 64 and 65 as described for the FIG. 7 embodiment which locks the pleat tip retaining gaps into their narrow form and firmly locks the filter media into the pleat retaining gaps while also making the filter frame rigid.

Figure 9:
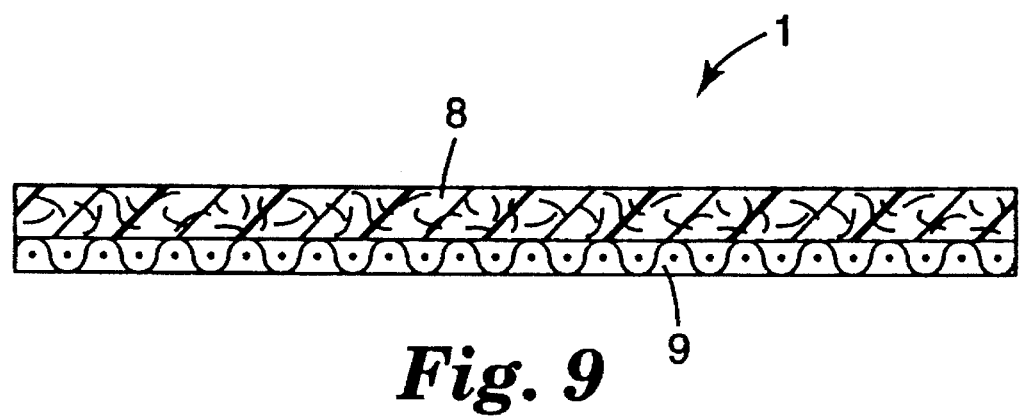
FIG. 9 is a side view of a pleatable filter media usable in the invention filter frame.

The filter media 1 (FIG. 9) can be formed of any conventional pleatable filter web 8 or filter web laminate. Suitable filter webs or laminates include those formed with at least one fibrous nonwoven or woven web. Preferably, the filter web or laminate 8 is formed with a nonwoven fibrous web which can be provided with an electret charge to enhance filter efficiency. In a laminate form, the web 8 can have suitable cover web layers or the like. If the filter web or laminate 8 is not sufficiently stable when pleated one or more relatively pleatable element(s) 9 can be provided. These pleatable elements can be a deformable metal or pleatable (e.g., by heat) thermoplastic netting. The pleatable element 9 generally provides no filtering properties and little pressure drop resistance. Overall, the filter web 8 or filter web laminate and pleatable elements 9 should be resiliently compressible such that when compressed by at least 10 percent, preferably 20 to 80 percent the filter media will exhibit an elastic recovery force such that the compressed filter media 1 will press against sidewall segments 25, which sidewall segments form the pleat retaining gaps 22, inhibiting removal of the filter media from the filter frame 11.

I claim:

1. A zigzag filter comprising a zigzag pleated filter media and a filter frame, said filter frame having two continuous outer sidewalls and two inner sidewalls each of said inner and outer sidewalls are separated by a continuous fluid impermeable spacer element, the inner sidewalls having a plurality of upstanding triangular pleat stabilizing elements with first pleat stabilizing element sidewalls tapering outward from a peak toward second pleat stabilizing element sidewall segments, two adjacent second sidewalls segments on separate pleat stabilizing elements forming pleat tip retaining gaps, the pleat stabilizing elements having a shape such that the pleat stabilizing elements support and engage the zigzag filter media first pleat tips on a first face of the pleated filter media, second pleat tips being frictionally engaged by the pleat retaining gaps on said first face of the pleated filter media such that the filter media second face pleat tips are partially compressed in said pleat tip retaining gaps, said continuous fluid impermeable spacer element being downstream of said pleat tip retaining gaps.

2. The filter of claim 1 wherein the first pleat stabilizing element sidewalls taper at an angle of from 20 to 55 degrees.

3. The filter of claim 1 wherein the first sidewalls taper at an angle of from 30 to 45 degrees.

4. The filter of claim 1 wherein the second sidewall segments taper at an angle of less than 10 degrees.

5. The filter of claim 1 wherein the second sidewall segments taper at an angle of from 0 to 10 degrees.

6. The filter of claim 1 wherein the second sidewall segments taper at an angle of from 0 to 5 degrees.

7. The filter of claim 1 wherein the pleat tip retaining gap second sidewall segments have a frictional engaging surface.

8. The filter of claim 1 wherein the frictional engaging surface is a textured surface.

9. The filter of claim 1 wherein the pleat tip retaining gap width is from 90 to 10 percent of the uncompressed thickness of the filter media at the second pleat tip over an extent of at least three times the width of the pleat tip retaining gap.

10. The filter of claim 4 wherein the pleat tip retaining gap width is from 80 to 20 percent of the uncompressed thickness of the filter media at the second pleat tip over an extent of at least three times the width of the pleat tip retaining gap.

11. The filter of claim 1 wherein the filter frame further includes two pairs of inner endwalls and outer endwalls joined by a fluid impermeable spacer, each pair of an inner endwall and an outer endwall forming a terminal pleat engaging gap, the fluid impermeable spacer being downstream of the terminal pleat engaging gap.

12. The filter of claim 11 wherein the filter frame is an integral molded structure formed from a thermoplastic polymer with the outer sidewalls and endwalls joined at their respective ends to form a continuous outer wall.

13. The filter of claim 11 wherein the filter frame is an integral structure with the outer sidewalls and endwalls joined at their respective ends to form a continuous outer wall with the spacer elements for the fluid impermeable endwalls and sidewalls forming a continuous integral spacer element.

14. The filter of claim 11 wherein the outer endwalls and sidewalls are joined at their respective ends by a bonding means.

15. The filter of claim 14 wherein the endwalls and sidewalls have been folded along fold lines on either side of said continuous integral spacer element.

16. The filter of claim 1 wherein said two pairs of inner and outer sidewalls are joined by connecting elements.

17. The filter of claim 16 wherein said connecting elements are elongated rods.

18. The filter of claim 16 wherein said two pairs of inner and outer sidewalls form two annular rings.

19. The filter of claim 14 wherein said bonding means is an adhesive.

20. The filter of claim 14 wherein said bonding means is an ultrasonic weld.

21. The filter of claim 14 wherein the filter frame is a flexible material, when the pleat retaining gaps extend down closely adjacent to the spacer element so as to allow the filter frame to be resiliently deformed when the outer endwalls and sidewalls are not joined allowing the pleat tip retaining gap to widen to facilitate insertion of the pleated filter media second pleat tips into the pleat tip retaining gap.

22. The filter of claim 1 wherein said filter media comprises a nonwoven fibrous web.

23. The filter of claim 22 wherein said nonwoven fibrous web fibers are electret charged.

24. The filter of claim 22 wherein said filter media further comprises a pleatable netting.

* * * * *